United States Patent
Frech et al.

(10) Patent No.: US 6,658,979 B1
(45) Date of Patent: Dec. 9, 2003

(54) HAND-OPERATED SCROLL SAWING MACHINE WITH A PISTOL-TYPE, BASE HOUSING THAT IS SUPPORTED ON THE LOWER ARM

(75) Inventors: Alfred Frech, Leinfelden-Echterdingen (DE); Tobias Lutz, Filderstadt (DE); Uwe Engelfried, Ostfildern (DE); Siegfried Keusch, Deizisau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/744,657

(22) PCT Filed: Apr. 22, 2000

(86) PCT No.: PCT/DE00/01288
§ 371 (c)(1),
(2), (4) Date: Jan. 29, 2001

(87) PCT Pub. No.: WO00/74905
PCT Pub. Date: Dec. 14, 2000

(30) Foreign Application Priority Data

Jun. 5, 1999 (DE) .......................................... 199 25 748

(51) Int. Cl.$^7$ ............................................... B27B 19/12
(52) U.S. Cl. .............................. 83/746; 83/574; 30/122; 30/392
(58) Field of Search ................. 30/122, 296.1, 30/392, 393; 83/574, 746

(56) References Cited

U.S. PATENT DOCUMENTS

| | | | |
|---|---|---|---|
| 2,015,275 A | * | 9/1935 | Kelley .......................... 83/747 |
| 2,753,898 A | | 7/1956 | Macfarland ................... 30/393 |
| 3,117,600 A | * | 1/1964 | Davis ........................... 83/574 |
| 5,027,518 A | | 7/1991 | Adomatis ..................... 30/392 |
| 5,176,059 A | | 1/1993 | Anderson ..................... 83/462 |
| 5,351,590 A | | 10/1994 | Everts ...................... 83/699.21 |
| 5,924,209 A | | 7/1999 | Ward ........................... 30/392 |
| 6,277,135 B1 | * | 8/2001 | Wang ........................... 30/316 |
| 6,357,123 B1 | * | 3/2002 | Manuel ........................ 30/392 |

FOREIGN PATENT DOCUMENTS

DE 87 10 927 U 10/1987

* cited by examiner

Primary Examiner—Hwei-Siu Payer
(74) Attorney, Agent, or Firm—Michael J. Striker

(57) ABSTRACT

A hand-guided power jigsaw (10) having a jigsaw blade (33) which can be detachably clamped between the free ends (53, 54) of two essentially parallel-arms (221, 222) that are preferably comprised of a U-shaped frame (22), in particular comprised of a tube, and which can be driven, in particular in a reciprocating manner, by a motor built into the jigsaw (10), wherein a laterally protruding handle (13) with a switch button (15) is disposed on the front of the free end of one of the arms (221, 222), is particularly maneuverable and easy to produce since the lower arm (221) has a, base housing (12) attached to it, which is embodied in the form of a pistol and protruding obliquely back and down from underneath the housing (12), has a handle (13) whose rear contour toward the base housing (12) forms a curved, angled throat (14), which rests in the hand of the user in a horizontally and vertically supported fashion.

17 Claims, 15 Drawing Sheets

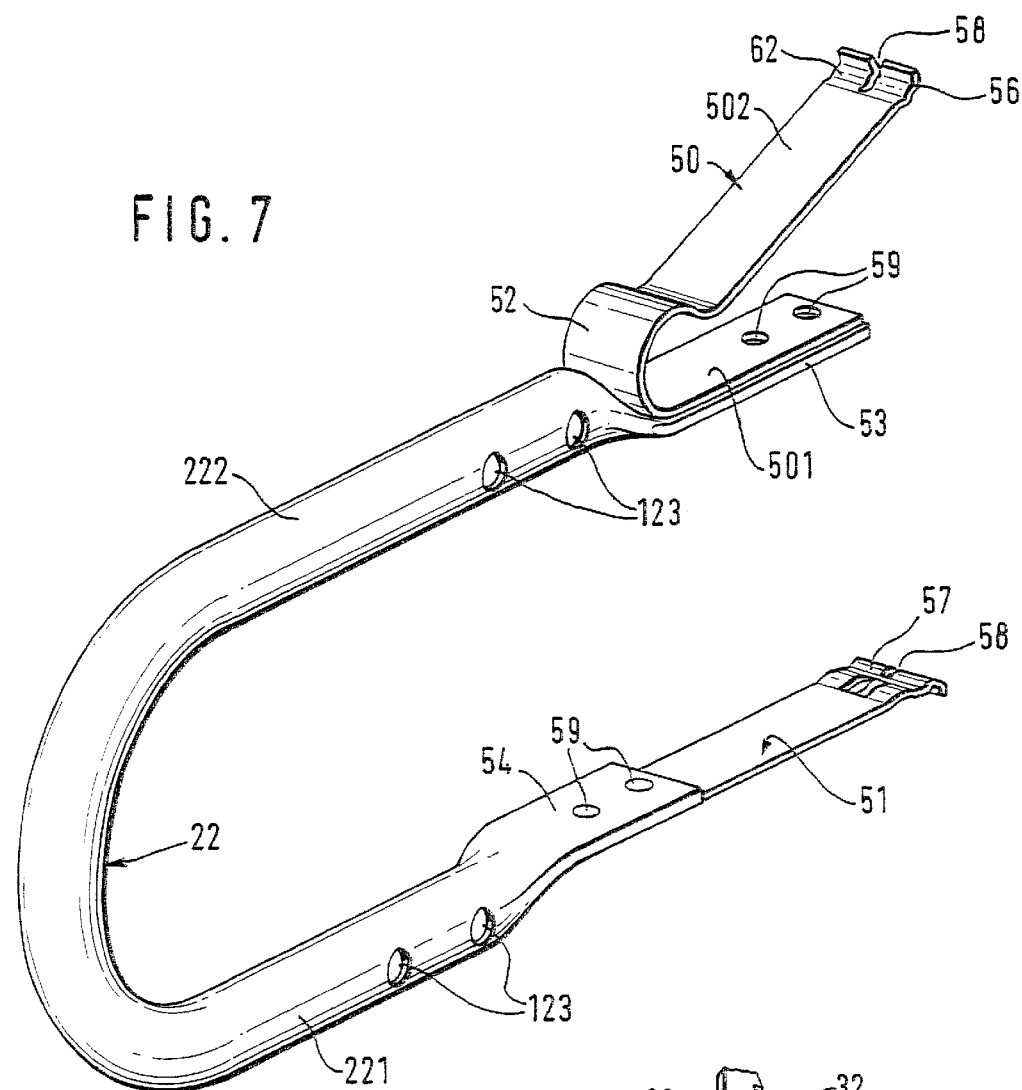

HAND-OPERATED SCROLL SAWING MACHINE WITH A PISTOL-TYPE, BASE HOUSING THAT IS SUPPORTED ON THE LOWER ARM

BACKGROUND OF THE INVENTION

The current invention is based on a hand-guided power jigsaw.

U.S. Pat. No. 5,027,518 has disclosed a power jigsaw of this generic type, which whose design corresponds to that of a hand-actuated jigsaw wherein the typically U-shaped frame has a handle protruding laterally downward, with a motor housing, wherein the back of the grip has a switch for controlling the energy supply of the motor.

In comparison to manual jigsaws, the known machine has the advantage that it is no longer necessary to execute the sawing motion by hand.

SUMMARY OF THE INVENTION

The power jigsaw according to the invention, has the advantage that it is very lightweight and handy and can be guided by the user in an especially well-controlled way.

The maneuvering reliability is improved by virtue of the fact that the pistol-like base housing adjoining the handle is elongated toward the rear and in the operating position, rests against the user's forearm.

Since the arms of the U-shaped frame are longer than the jigsaw blade by a multiple of its length, in particular twice as long as it, relatively large work pieces can be machined all the way to their centers with the jigsaw, i.e. in a board-like work piece, the maximal cutting depth from its edge is approx. 270 mm and is therefore relatively deep.

Since the switch button of the on/off switch of the motor is disposed between projections on the handle, this switch button can easily be operated, particularly with the index finger, and is simultaneously protected from unintentional actuation.

Since the base housing encapsulates the motor and drive means for moving the jigsaw blade back and forth, the motor and drive means are protected from dust and damage and the user is protected from being injured by the moving parts. The same advantage is achieved by virtue of the fact that on its free end, the upper arm of the frame has an end housing which contains the clamping means and drive means, for detachably clamping the jigsaw blade.

Since the jigsaw has a flat support surface, which is disposed on top of its base housing, is structured with parallel grooves, and is flush with the lower arm, the jigsaw can be guided in relation to the work piece in an especially well-controlled way with no lateral travel so that sawing can take place without deviation from lines laid out with a straightedge or compass.

Since the base housing of the jigsaw can be detachably coupled, particularly in detent fashion, to a sawing table, which can be fastened to a workbench for example, wherein the handle protrudes downward beyond the sawing table in an easy-to-grasp manner, the jigsaw with the sawing table attached to it can be used as a hand tool that can be positioned in a particularly precise manner or can be used as a stationary device when the sawing table is flange-mounted to a workbench.

Since the base housing of the power jigsaw can be coupled in a play-free fashion to the sawing table by means of longitudinal guides, in particular by means of discontinuous groove-and-spring guides, the power jigsaw can be inserted from above into the sawing table and connected to it in bayonet locking fashion without the use of an auxiliary tool.

Since the power jigsaw can be detached from the sawing table by pressing on an overlockable button, it can be detached from the sawing table in a particularly rapid and convenient manner without the use of an auxiliary tool.

Since the power jigsaw has a work piece depressor that can be moved parallel to the jigsaw blade and simultaneously functions as a finger deflector, the work piece to be machined is fixed in relation to the power jigsaw in a manner that can be controlled particularly well so that precise sawing can be done, wherein the user is protected against being injured by the oscillating saw blade.

Since the arms of the U-shaped frame have flat, free ends and each of these ends supports a leaf spring, the leaf springs are connected to the frame in a positionally secure manner with contact over their entire surface and are aligned parallel to one another so that they function as rockers for the parallelogram-like guidance of the saw blade and for producing a slight oscillating stroke.

Since the leaf springs have a central fork slot on their free ends, into each of which a clamping end of the jigsaw blade can be detachably suspended, it is possible to clamp the jigsaw blade in a positively engaging manner without tools in a manner that is more secure than the previously known frictionally engaging clamping of jigsaw blades through rotation of a wing nut.

Since the upper leaf spring is bent into a U-shape and is fastened, in particular riveted, with its lower leg to the free end of the arm of the U-shaped profile so that the legs point outward in the same direction as the free arm, wherein the curved part and the upper U-leg can be freely pivoted, this produces in a particularly inexpensive manner an elastically pre-stressed rocker for a parallelogram-like transmission for driving the jigsaw blade to oscillate, which solely produces the upward stroke of the jigsaw blade, wherein its counterpart rocker is the leaf spring fastened to the lower arm and its coupling is the jigsaw blade.

Since the lower leaf spring can be coupled to the motor, in particular in a positively engaging manner, via driving means, in particular via a connecting rod, the driving force is not transmitted directly onto the saw blade so that the movement reversal in the dead points on the movement path of the saw blade is damped.

Since the lower leaf spring, which is under no stress in the horizontal position, has a stamped, downwardly curved loop at its free end, which constitutes an eyelet for engaging the connecting rod, it is possible to produce a particularly inexpensive coupling between the connecting rod and the leaf spring.

Since the leaf springs, on their free ends, have a groove extending lateral to the slot, in which a nipple of the saw blade can be supported in a centered, pivotable fashion, in particular with its sharp edge, the jigsaw blade can be coupled to the oscillating leaf springs in a clamp-free, articulating fashion in the parallelogram-like mechanism.

Since the nipples are comprised of injection-molded plastic and have a square region pointing toward the saw blade, which passes through the fork slot in a play-free manner, the clamping ends of the jigsaw blade are reliably centered, are oscillation damped, and are electrically insulated in relation to the leaf springs.

Since the U-shaped frame is comprised of metal, in particular a tube with a circular or elliptical cross section, and the base housing and end housing are comprised of plastic, in particular of two housing shell halves that can be assembled, this power jigsaw enjoys a combination of lightweight construction, high stability of the support of the jigsaw blade and thereby ruggedness, ergonomic form, and a high degree of operational reliability.

BRIEF DESCRIPTION OF THE DRAWINGS

The invention will be explained in detail in an exemplary embodiment in conjunction with the accompanying drawings.

FIG. 7 shows a detail of the U-shaped frame with the leaf springs, FIG. 8 shows the lower leaf spring with a jigsaw blade suspended in it.

DESCRIPTION OF THE PREFERRED EMBODIMENTS

Figure 1:
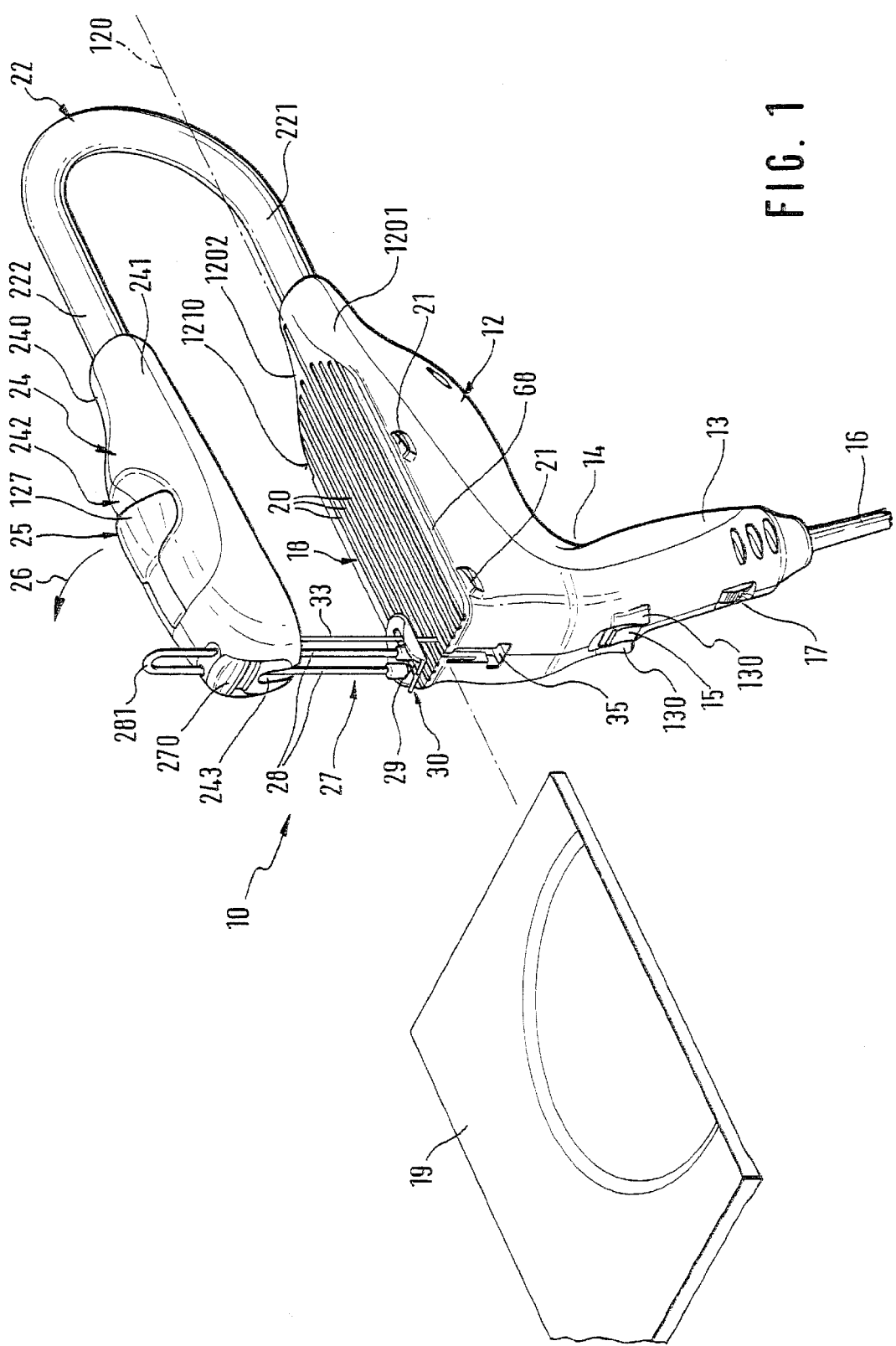
FIG. 1 is a three-dimensional front, left view of the hand guided power jigsaw according to the invention.

The power jigsaw 10 shown in FIG. 1 is comprised of a pistol-like lower base housing 12 with a handle 13 that protrudes laterally downward. From the region where it emerges from the base housing 12, the handle 13 is angled toward the rear. In the region where it emerges from the base housing 12, the rear contour of the handle 13 forms a concavely curved throat 14, which continues horizontally toward the rear as a lower outer contour of the base housing 12. The throat 14 fits into the user's hand and rests against the hand or is held in the hand, approximately in the center between the thumb and index finger. As a result, the horizontally extending rear region of the base housing 12 is supported on the back of the user's hand and on his forearm and constitutes an elongated support lever so that the jigsaw 10 can therefore be maneuvered in a particularly well-controlled manner when sawing.

The handle 13 has a switch button 15 at the front, which is adjoined closely by cam-like projections 130 protruding from the handle 13 and is used for opening and closing the electrical circuit. A power cable 16 protrudes from the bottom of the handle 13 and is used to supply energy to the motor, not shown, which is disposed inside the base housing 12.

Underneath the switch button 15 on the handle 13, there is an adjusting wheel 17 of a set of regulating electronics, not shown, for adjusting the speed of the motor.

The base housing 12 is comprised of two longitudinally divided half shells 1201, 1202 and at the top, has a planar support surface 18 the shape of a ship's deck, with longitudinal grooves 20, which can support a work piece 19 in order to be machined.

On each of the two sides, underneath a circumferential outer edge 68, the base housing 12 has two clamping clips 21 spaced apart from each other, of which only the two disposed on the left side are shown.

Protruding rearward from the base housing 12, there is a lower arm 221 of a U-shaped frame 22, which is comprised of curved tube and is enclosed in a sealed manner by the half shells 1201, 1202. The lower arm 221 transitions in an arc shape upward toward the front into an upper arm 222 that extends parallel to the lower arm 221. On its free end oriented toward the front, this upper arm 222 has an end housing 24 which is affixed to the arm 222 by means of fastening screws 23 (FIGS. 5, 6) and is comprised of two longitudinally divided housing shells 240, 241. The end housing 24 has a clamping lever 25 that can be accessed from above and whose grip 127 can be grasped from underneath by an user's finger by means of a depression-like or notch-like indentation 242 and can be pivoted upward in the direction of the actuation arrow 26 in order to open.

On its rounded front end, the end housing 24 has a work piece depressor 27 which is comprised of two round sliding bars 28, which are supported so that they can be moved in the end housing 24 and locked in place in relation to the lower housing 12. The two sliding bars 28 protrude up from the end housing 24 and are connected to each other by means of a U-shaped curve 281. On their lower free ends oriented toward the support surface 18, the sliding bars 28 have a foot-like stop 30, which extends back parallel to the support surface 18 in the shape of a horseshoe, with a slot 29 that opens toward the front in which a jigsaw blade 33, which points toward the front with its row of teeth 32 (FIGS. 5, 6), is encompassed and guided laterally and from the rear, particularly in a contact-free manner, and is protected from excessive deflection directed laterally or toward the rear.

After its push button 270 protruding from the front of the end housing is depressed, the work piece depressor 27 can be slid upward out of its locked position.

The jigsaw blade 33 has two clamping ends (FIGS. 5, 6), which have plastic nipples 34 injection molded onto them. These increase the diameter of the saw blade 33 considerably at its clamping ends so they can be suspended like a Bowden cable in fork-like supports 56, 57 (FIGS. 5, 6) and can therefore be clamped in place.

In its front region, beneath the push button 270, the end housing 24 has a slot-like mounting window 243 through which the clamping end of the saw blade 33, which is embodied as a nipple 34, can be suspended in its upper support 56. Corresponding to this, the base housing 12 has a frontal mounting slot 35 through which the lower clamping end of the jigsaw blade 33, in the form of a second nipple 34, can be suspended.

Figure 2:
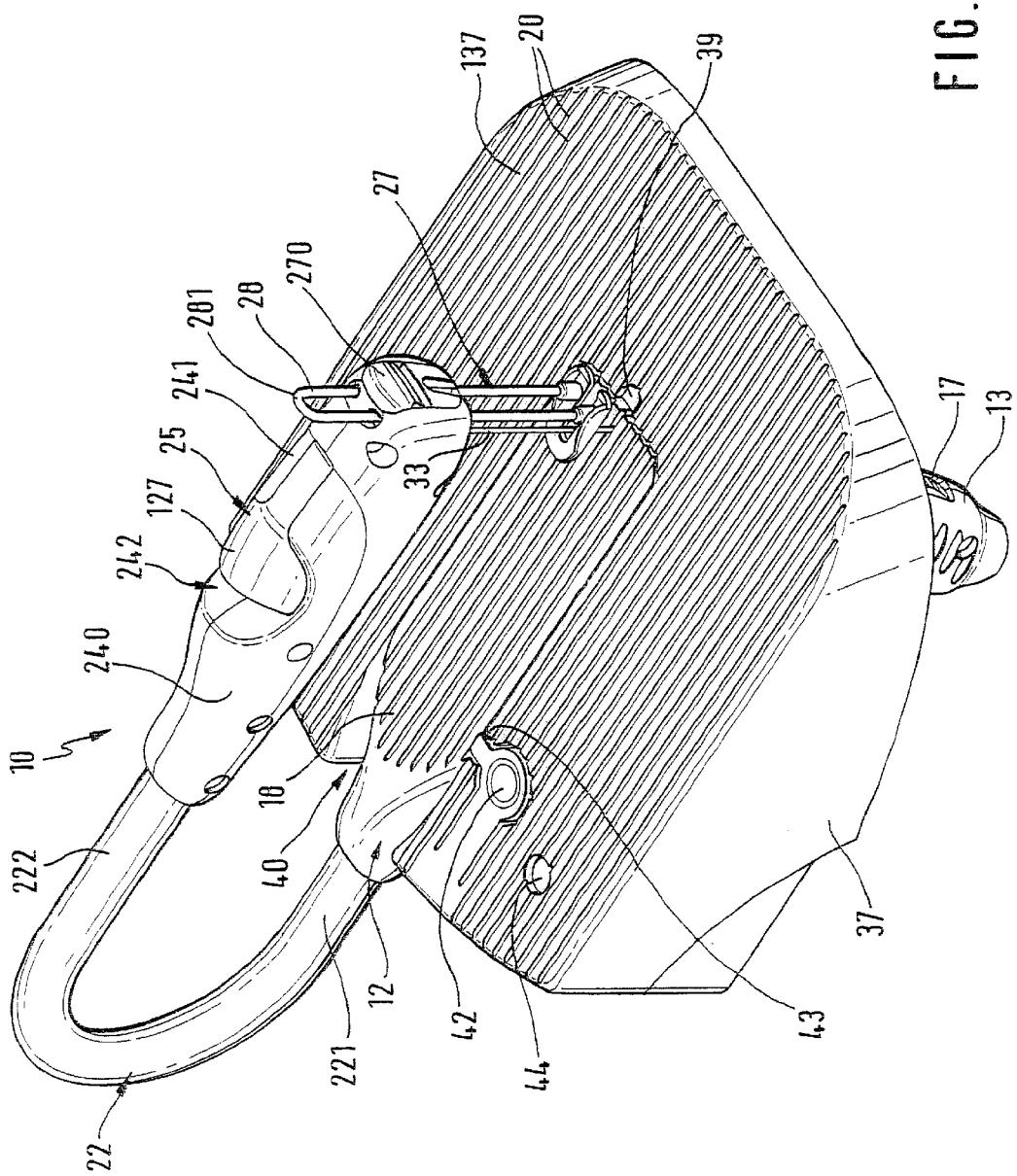
FIG. 2 is a front, right view of the power jigsaw according to FIG. 1, connected in detent fashion to a sawing table.

FIG. 2 shows the power jigsaw 10 from the top right, coupled to a sawing, table 37, whose upper, planar support surface 137 transitions in a flush manner into the support surface 18 of the base housing 12, wherein the grooves 20 of the support surfaces 137, 18 merge uniformly with one another.

At the front, the sawing table 37 has a downwardly protruding suction fitting 38 (FIGS. 13, 14) which at the top, in the vicinity of the support surface 137, opens out into a suction opening 39 through which saw cuttings produced during sawing can be aspirated when a suction hose of a vacuum cleaner or the like is attached to the suction fitting 38.

In the center of its rear region, the sawing table 37 has a U-shaped recess 40 that leads into the support surface 137 and continues toward the bottom, which recess corresponds to the outer contour and the outer edge 68 of the support surface 18 of the base housing 12. At the top, on opposite sides, the recess 40 has longitudinal guides 69, 70, 73 (FIG. 13) which make it possible for the base housing 12 of the power jigsaw 10 to be snapped into the sawing table 37 in bayonet locking fashion and to be secured there in a play-free manner.

A locking button 42 constitutes a detent stop 43, which engages in a corresponding recess 1210 of the base housing 12 close to the support surface 18 and detachably secures the base housing 12 and therefore the power jigsaw 10 in relation to the sawing table 37.

The support surface 137 of the sawing table 37 is perforated at right angles leading toward the bottom by screw holes 44 that are uniformly spaced in relation to the outside, through which screws can be slid and by means of which the sawing table 37 can be screwed to a stationary support, for example a workbench or the like. In addition, on its outer edge toward the rear, the sawing table 37 has clamp openings 71 (FIG. 13) for the insertion of a clamping jaw of a screw clamp, not shown, which can be used to fasten it to a stationary support.

The handle 13 protrudes underneath the sawing table 37 so that the power jigsaw 10, together with the sawing table 37 secured to it, can be used as a hand tool. As a result, the power jigsaw 10 can be aligned particularly easily in relation to the work piece 19 so that the work piece is positioned at right angles to the saw blade 33 and to the support surface 18, 137.

Figure 3:
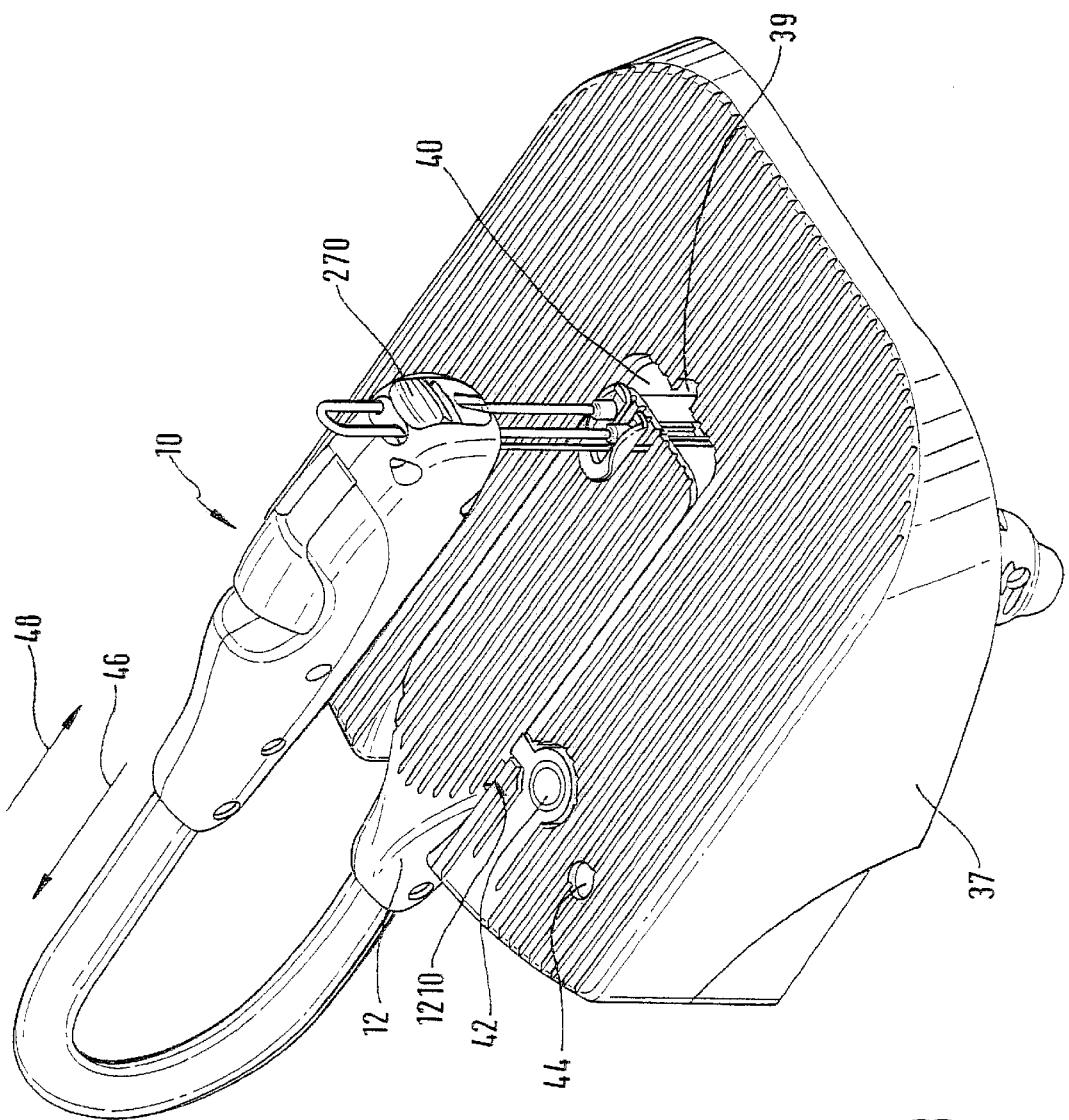
FIG. 3 shows the power jigsaw according to FIG. 2, immediately before the detent connection of the sawing table.

FIG. 3 shows the power jigsaw 10 when the sawing table 37 is being detached from it or shortly before the sawing table 37 is snapped into it or connected to it in detent fashion. It is clear from this FIG. that the base housing 12 must be slid in relation to the sawing table 37, parallel to its support surface 137, for the final detent connection or detachment. Prior to this, the base housing 12 of the power jigsaw 10 must be inserted perpendicularly from above into the recess 40 so that the clamping clips 21 and the outer edge 68 of the housing 12 come into the engagement position with the corresponding guide springs 69, 70, 73 of the sawing table 37.

The arrows 46, 48 indicate the direction for detaching and attaching the power jigsaw 10 in relation to the sawing table 37 after the perpendicular insertion of the base housing 12 into the recess 40.

Figure 4:
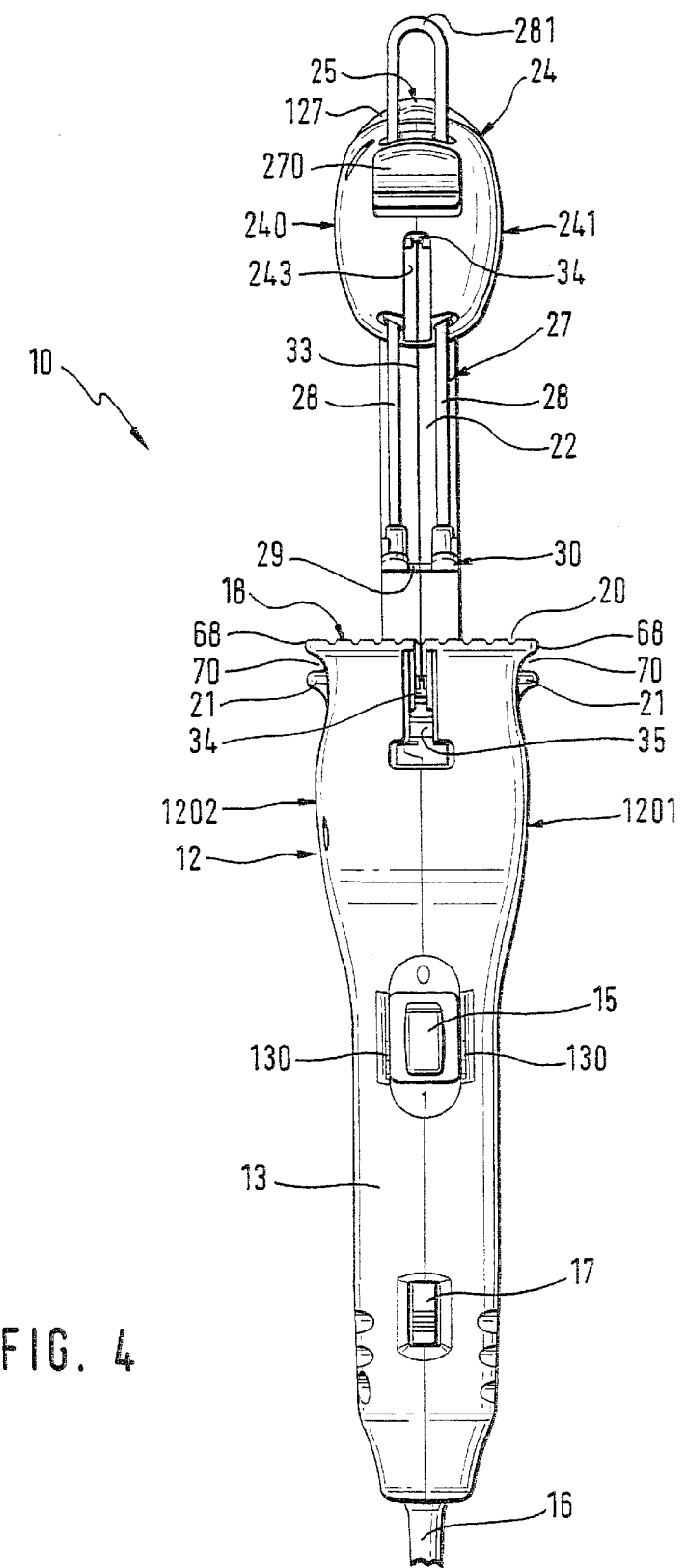
FIG. 4 is a front view of the power jigsaw.

FIG. 4 shows the front view of the power jigsaw 10, wherein the cross section or contour of the base housing 12—which is particularly relevant for the coupling to the sawing table 37—is shown, with the clamping clips 21 and the outer edge 68. The mounting slot 35 and the mounting window 243 and other details indicated in the previous FIGS. can also be seen here without having to be mentioned again here.

Figure 5:
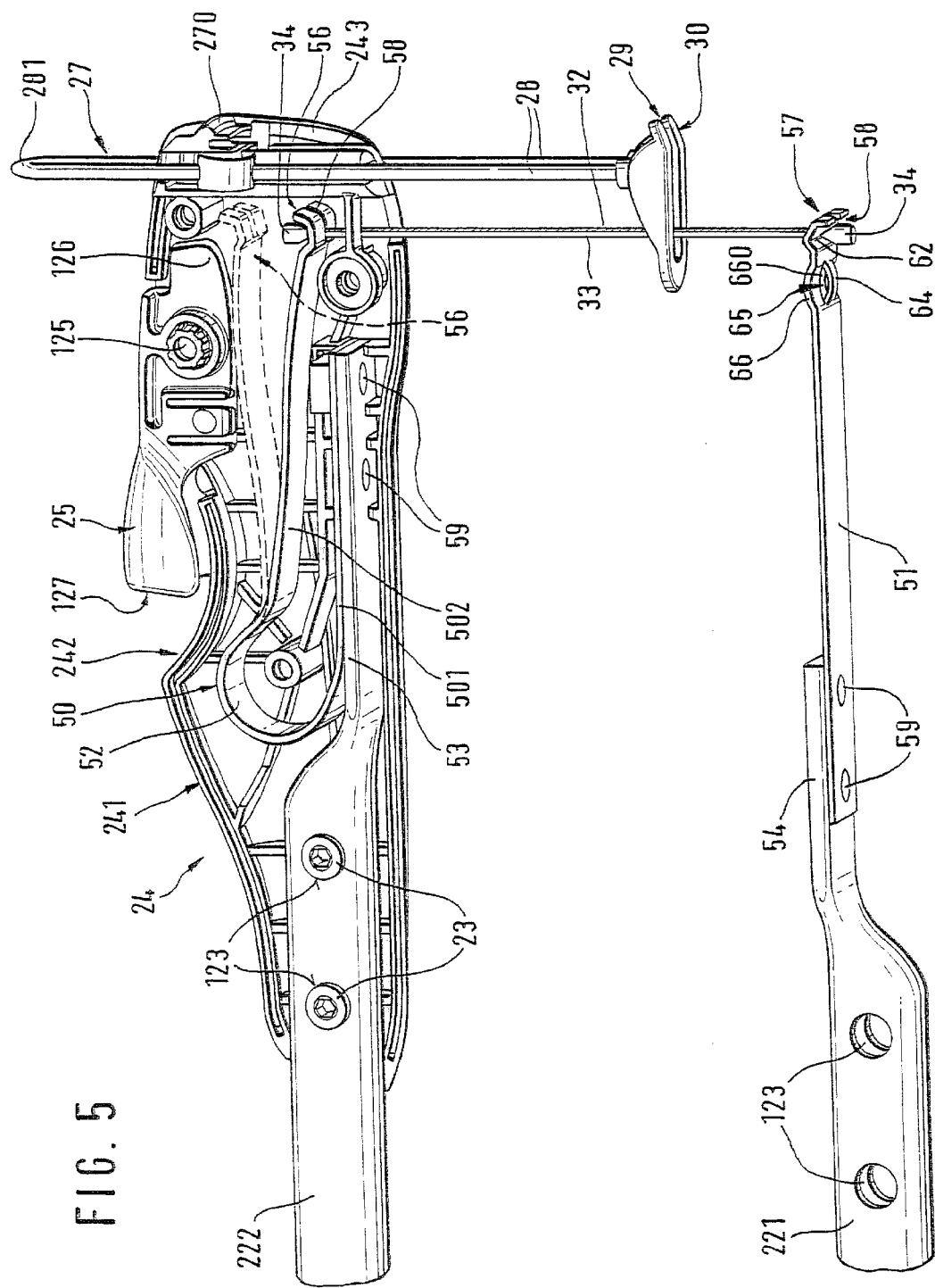
FIG. 5 is a three-dimensional right-hand view, with a detached, open end housing.

FIG. 5 shows the front regions of the lower and upper arms 221, 222 of the U-shaped frame 22, without the base housing 12, with only the left half shell of the end housing 24 and the clamping mechanism for detaching and attaching the jigsaw blade 33.

On its front end, the lower arm 221 has a horizontal flattening 54 which has a flat leaf spring 51 connected to it, in particular riveted, at fastening points 59. On its free end 57 that serves as a support for the clamping end of the saw blade, the leaf spring 51 has a central fork slot 58 to allow the saw blade 33 to pass through and to secure its nipple 34. The free end 57 of the lower leaf spring 51 is angled downward at the extreme end and adjacent to this, is angled upward like a roof toward the rear so that a channel 62 is formed in the transverse direction on the underside of the roof-like angle and a sharp edge 61 of the nipple 34 is supported in an articulating, pivotable fashion in this channel 62 (FIG. 8). After the roof-like region, the free end 57 of the lower leaf spring 51 continues back in a short, planar region, which is adjoined by an upward arch 66, with a central longitudinal slot 660, which is constituted by a downward-curved loop 64 that is produced by means of stamping or embossing. The arch 66 and the loop 64 jointly form an oval eyelet 65 for the suspension of a connecting rod 67 (FIG. 9), which converts the rotary motion of the motor into an up-and-down motion of the lower leaf spring 51.

The left shell 241 of the end housing 24 is fastened to the upper arm 222 of the frame 22 by means of fastening screws 23. Like the free end of the lower arm 221, the free end of the upper arm 222 also constitutes a horizontal flattening 53, whose top side is fastened, in particular riveted, to the upper leaf spring 50 at fastening points 59. The upper leaf spring 50 extends as a U that opens toward the right, with its legs 501, 502 toward the outside like the free end 53 of the upper arm 222, wherein the lower, short leg 501 is fastened to the arm 222. The legs 501, 502 are connected to each other by means of a curved part 52.

The free end 56 of the upper, longer leg 502 of the leaf spring 50 is angled upward at the free end and adjacent to that, is shaped like a downward-pointing V—in a mirror image to the outer end 57 of the lower leaf spring 51 and likewise forms a channel 62 therein which likewise has a central fork slot 58 passing through its middle so that the saw blade 33 is supported in an articulating fashion, with its other nipple 34 in the fork slot 58 or in the channel 62 of the V-shaped region, in a mirror image to the lower clamping end 34 of the saw blade 33.

Close to their free ends, the arms 221, 222 have through openings 123 which extend lateral to the plane spanned by the frame 22 and permit the passage of fastening screws 23 for the attachment of the base housing 12 or end housing 24, in particular of their half shells.

The upper leg 502 of the upper leaf spring 50 is associated with a clamping lever 25 embodied as a two-armed lever, which can be pivoted upward with its grip 127 around a pivot shaft 125 in the end housing 24 so that its cam 126 travels downward and thereby carries the upper leg 502 of the leaf spring 50 along with it toward the lower arm 221. For the sake of better engagement of the user's finger, the grip 127 of the clamping lever 25 is a tubular, hollow body that is open toward the rear which the user can easily insert a finger into, guided by an indentation 242 in the outer contour of the end housing 24, and pivot upward.

FIG. 5 also shows the front region of the end housing 24, with the work piece depressor 27. Its sliding bars 28 support the foot-like stop 30, which has a central slot 29, underneath the end housing 24. The horseshoe-shaped embodiment of the stop 30 for encompassing the saw blade 33 at the sides and back is also shown, as is the push button 270 which, when depressed, can release the locking connection of the depressor 27 or the sliding bars 28 in the upward direction. As a result, the user can easily adjust the depressor 27 manually by raising or lowering the curve 281.

The clamping lever 25 is depicted in the clamping position, wherein it rests in the concave recess and is thereby flush with the outer contour of the end housing 24. The upper leaf spring 50 is shown with only dashed lines in the upper dead point position, i.e. in the clamped position and is shown with solid lines in the release position for changing the saw blade 33.

Figure 6:
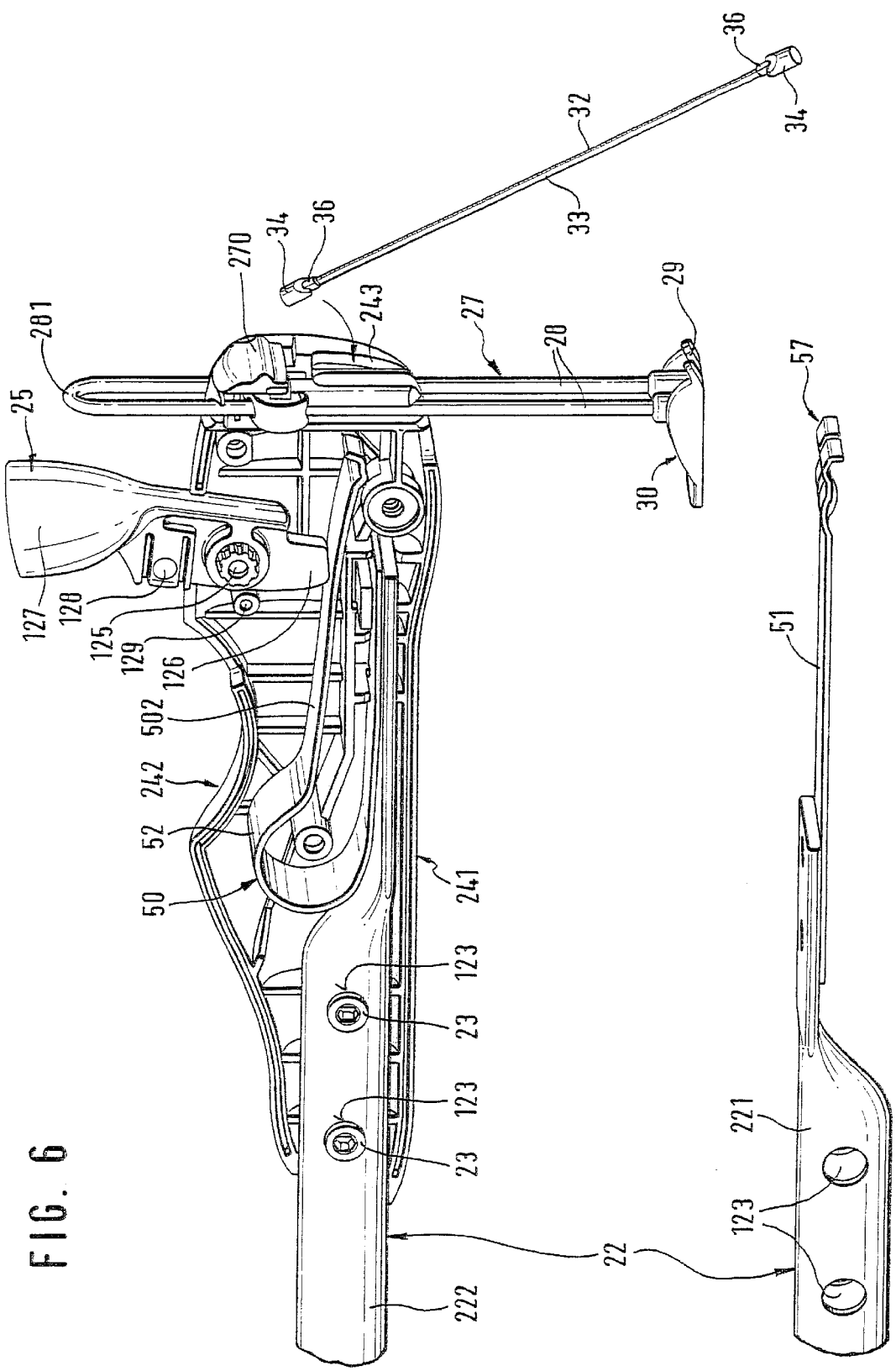
FIG. 6 shows the view according to FIG. 5 from above, with the clamping lever pivoted into the release position.

FIG. 6.shows the same details as FIG. 5, wherein only the clamping lever 25 is pivoted with its grip 127 upward and, with its cam 126 pivoted downward, presses the lower leg 502 of the leaf spring 50 downward. This figure also shows the concave indentation 242 for the flush insertion of the grip 127 inside the outer contour of the end housing 24. Furthermore, a detent pin 129, adjacent to the pivot shaft 125, of the housing shell 241 is shown, into which a hollow, cylindrical detent opening 128 of the clamping lever 25 can snap once the release position is attained. The saw blade 33 is detached from the supports or the free ends 56, 57 of the upper and lower leaf springs 50, 51 and is removed toward the front or is ready for re-insertion into the supports. To do so, the saw blade 33 must pass through the mounting window 243 in the end housing 24 and the mounting slot 35 (FIG. 1) in the base housing 12.

FIG. 7 shows the U-shaped frame 22 with a round cross section made out of metal tubing, with the leaf springs 50, 51 riveted to it, wherein the free end 56 of the upper leaf spring 50 with the longitudinal fork slot 58 and the channel 62 are particularly clear and so are the planar, parallel alignment of the upper and lower flattenings 53, 54 of the upper and lower arms 222, 221, without need of repeating the other details shown, which have already been discussed in relation to the preceding figures.

The oscillated upper leaf spring 50 and the straight lower leaf spring 51 are connected to the U-shaped frame 22 in a positively engaging manner by means of hollow rivets at the flat end 53, 54 of the arms 122, 121. The advantage of the riveted connection is its oscillation insensitivity in relation to the dynamic stresses of the leaf springs 50, 51. The frame 22 thereby serves as a rigid connecting member between the leaf springs 50, 51 oscillating in the base housing 12 and in the end housing 24 and particularly resists deflection and torsion while having a low intrinsic mass.

In order to increase the rigidity of the frame 22 in the saw blade stroke direction, it is advantageous to select its cross section as oval instead of round or to manufacture, it out of carbon fiber material instead of metal.

Since the lower leaf spring 51 has a number of curves in the vicinity of its support 57, it is prevented from excessive expansion in the vicinity of the eyelet 65 where the drive force of the motor is transmitted to the leaf spring 51 via the connecting rod 67.

In its straight position parallel to the arm 221, the lower leaf spring 51 is neutral and when deflected by 4 mm measured at the free end 57, has a force increase of approx. 12 N. The lower leaf spring 51 is only used to guide the saw blade 33. By contrast, the upper U-shaped leaf spring 50, due to its upwardly directed initial tension, produces a saw blade tension over the cutting stroke of the saw blade 33. The leaf spring 50 is designed so that it exerts approx. 50 N in the upper end position or in the upper dead point (OT). This force increases to approx. 65 N with a stroke of 8 mm until the lower dead point (UT) is reached so that the tensile force and thereby also the saw blade tension fluctuates between at least 50 N and maximally 65 N during the cutting stroke of the saw blade 33.

In lieu of the upper, U-shaped leaf spring 50, a trapezoidal, flat leaf spring can also be used. A spring of this kind has the same spring characteristic curve, but also has the advantage of a greater lateral stability, i.e. the saw blade is reliably prevented from being deflected laterally because the relatively low lateral rigidity of the curved part 52 of the leaf spring 50 is eliminated. In addition, the moving mass is reduced and the riveting of a straight, trapezoidal spring to the arm 222 of the frame 22 is simpler than that of the U-shaped spring 50. Furthermore, the trapezoidal shape gives the bending stress a more uniform distribution when the spring end is deflected during the cutting stroke of the saw blade 33.

FIG. 8 shows an enlargement of the free end 57 of the lower leaf spring 51, with the fork slot 58, the channel 62, the loop 64, the arch 66, the eyelet 65, and the slot 660. It is clear that the nipple 34 of the jigsaw blade 33 is supported in an articulating, pivotable fashion, with its sharp edge 61 in the channel 62, wherein the jigsaw blade 33 passes through the fork slot 58 with its row of teeth 32 or with a square region 36 that adjoins the sharp edge 61. The plastic nipple 34 is supported in a play-free manner in the fork slot 58 by virtue of the fact that it continues on after the sharp edge 61 in the form of a square region 36, which extends well beyond the sharp edge 61 and encompasses the saw blade 33 on all sides. The square region 36 also serves to electrically insulate the saw blade 33 in relation to the motor and the transmission.

Figure 9:
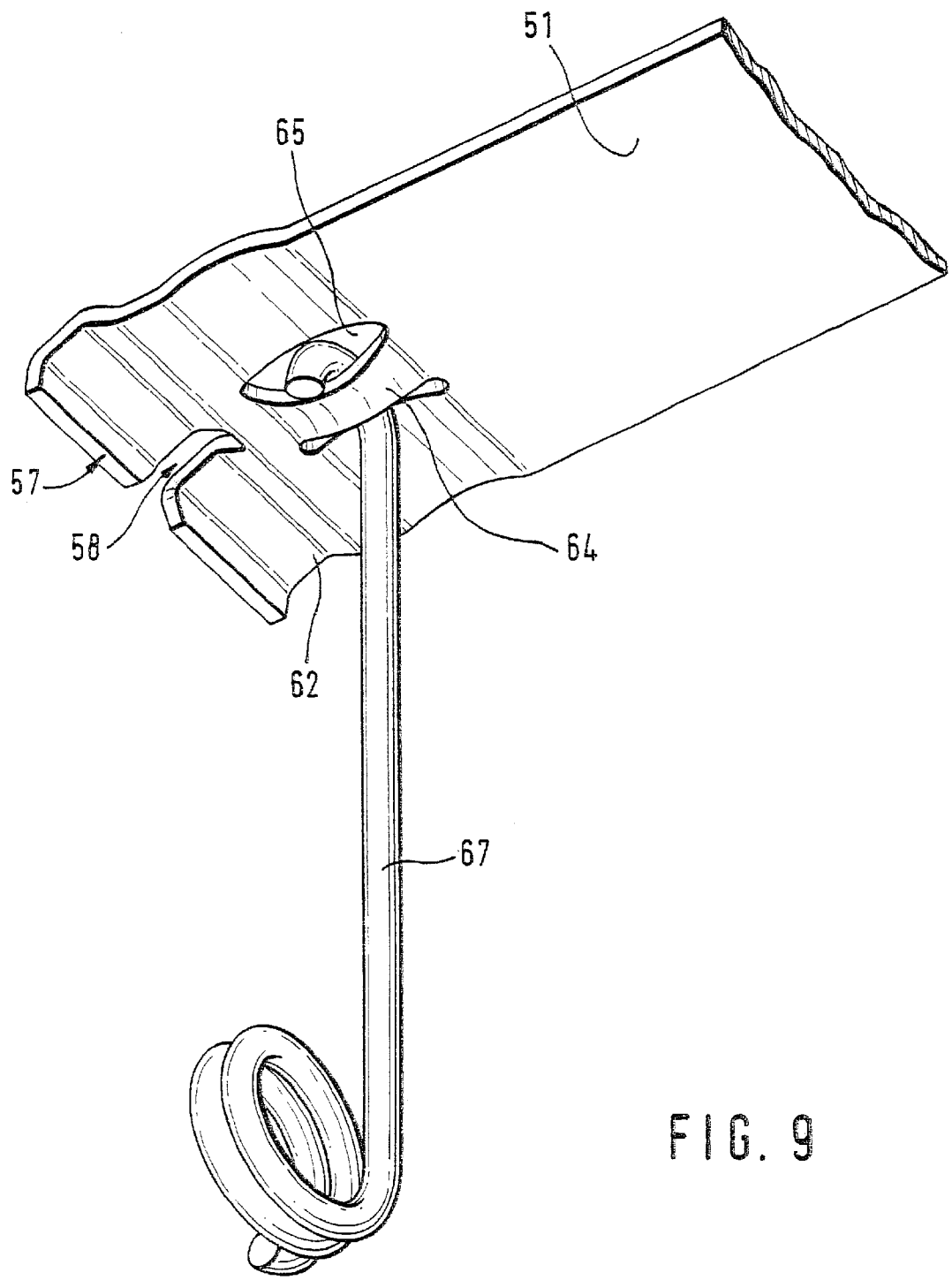
FIG. 9 is a bottom view of the lower leaf spring with connecting rod.

FIG. 9 is a bottom view of the free end 57 of the lower leaf spring 51, which shows the fork slot 58, the channel 62, the loop 64, the eyelet 65, and the longitudinal slot 660; a connecting rod 67 engages in hook fashion in the eyelet 65 and is set into a back-and-forth or up-and-down motion by the motor, which is not shown.

Figure 10:
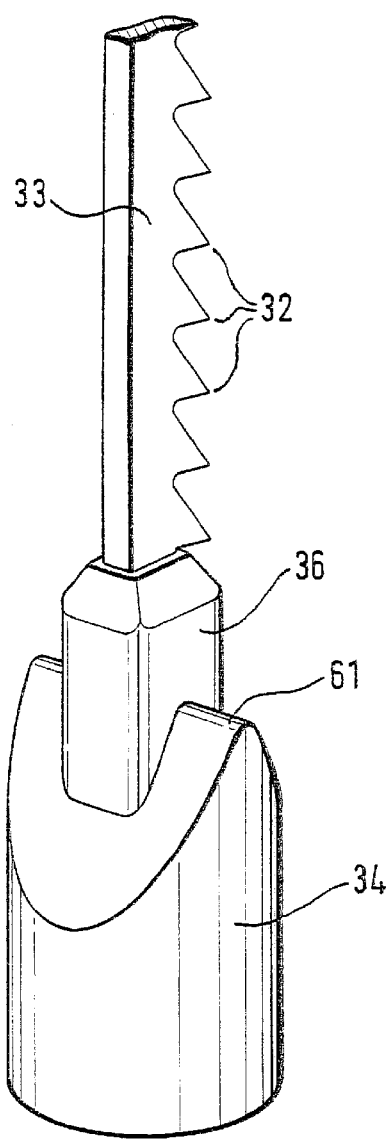
FIG. 10 shows the clamping end of the jigsaw blade.

FIG. 10 shows the nipple 34, which extends cylindrically from the outermost end of the jigsaw blade 33 and by means of two roof-like slopes toward the other nipple 34, constitutes the sharp edge 61 from which the square region 36 extends, which supports the jigsaw blade 33 in a play-free, rotationally secured fashion in the fork slot 58 of the leaf springs 50, 51.

Figure 11:
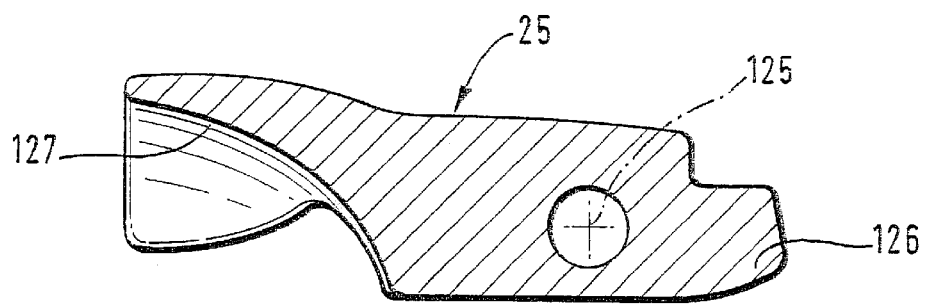
FIG. 11 shows a detail of the clamping lever.

FIG. 11 shows a detail of the clamping lever 25, which is embodied as a two-armed lever whose one arm is embodied as a hollow grip region 127 and whose other arm is embodied as a cam 126, with the rotation axis 125 disposed between them.

Figure 12:
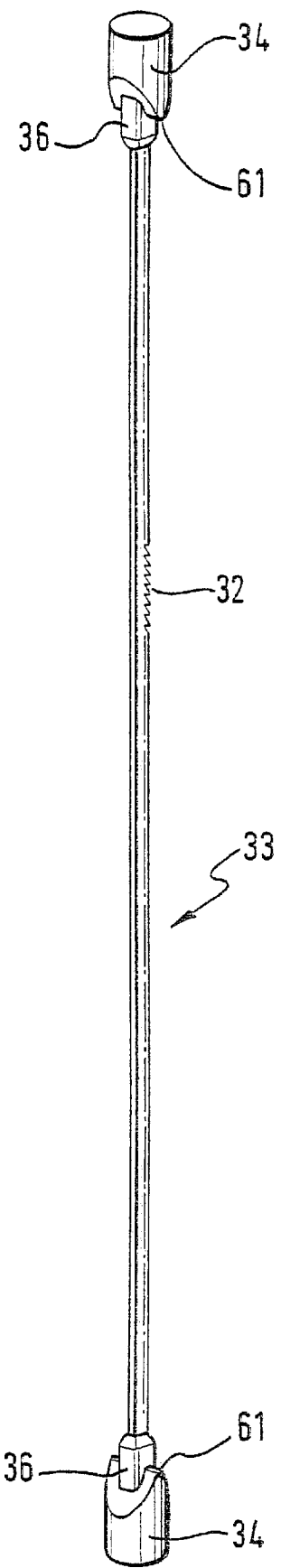
FIG. 12 shows a detail of the saw blade.

FIG. 12 shows a detail of the jigsaw blade 33 with the clamping ends embodied as nipples 34, their roof slopes, sharp edges 61, and square regions 36.

Figure 13:
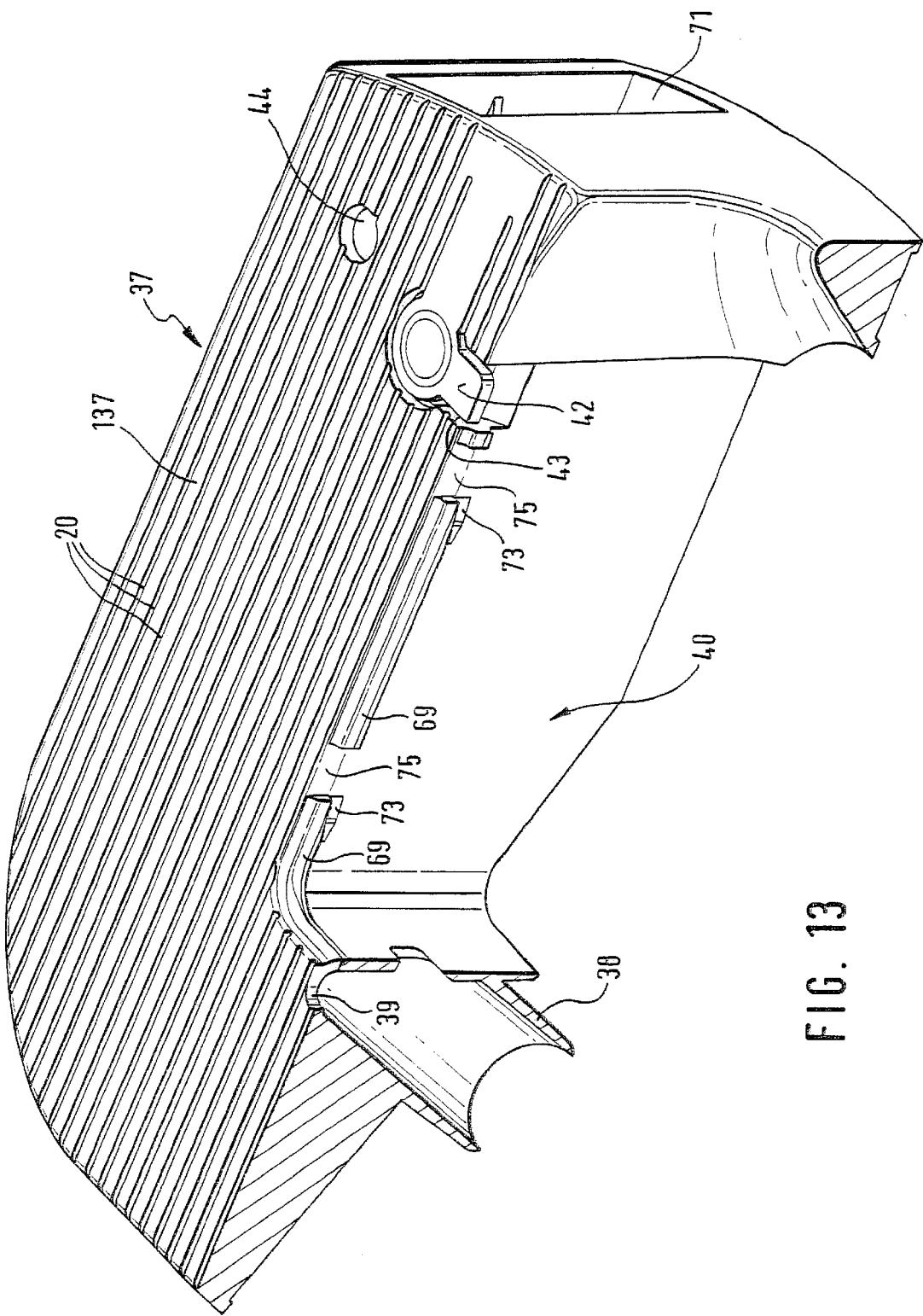
FIG. 13 is a sectional view of the sawing table.

FIG. 13 is a three-dimensional partial longitudinal section through the sawing table 37, which shows the suction fitting 38, the suction opening 39, the recess 40, the locking button 42 with the detent stop 43, the screw opening 44, and the grooves 20. Guide springs 69 that serve as a longitudinal guide for the base housing 12 are also shown, with gaps 75 and lateral ramps 73 as well as an inlet opening 71 on the outside at the back for the clamping jaw of a screw clamp used to fasten the sawing table to a support such as a workbench or the like. The suction opening 39 in the sawing table 37 is also used as a mounting opening for changing the saw blade during stationary operation of the power jigsaw, i.e. the power jigsaw and the sawing table do not have to be detached from each other.

The gaps 75 of the guide springs 69 are used for the perpendicular insertion of the lateral clamping clip 21 of the base housing 12 of the power jigsaw 10 from above into the recess 40 for engagement underneath the guide springs 69 and for lateral support against the ramps 73.

Figure 14:
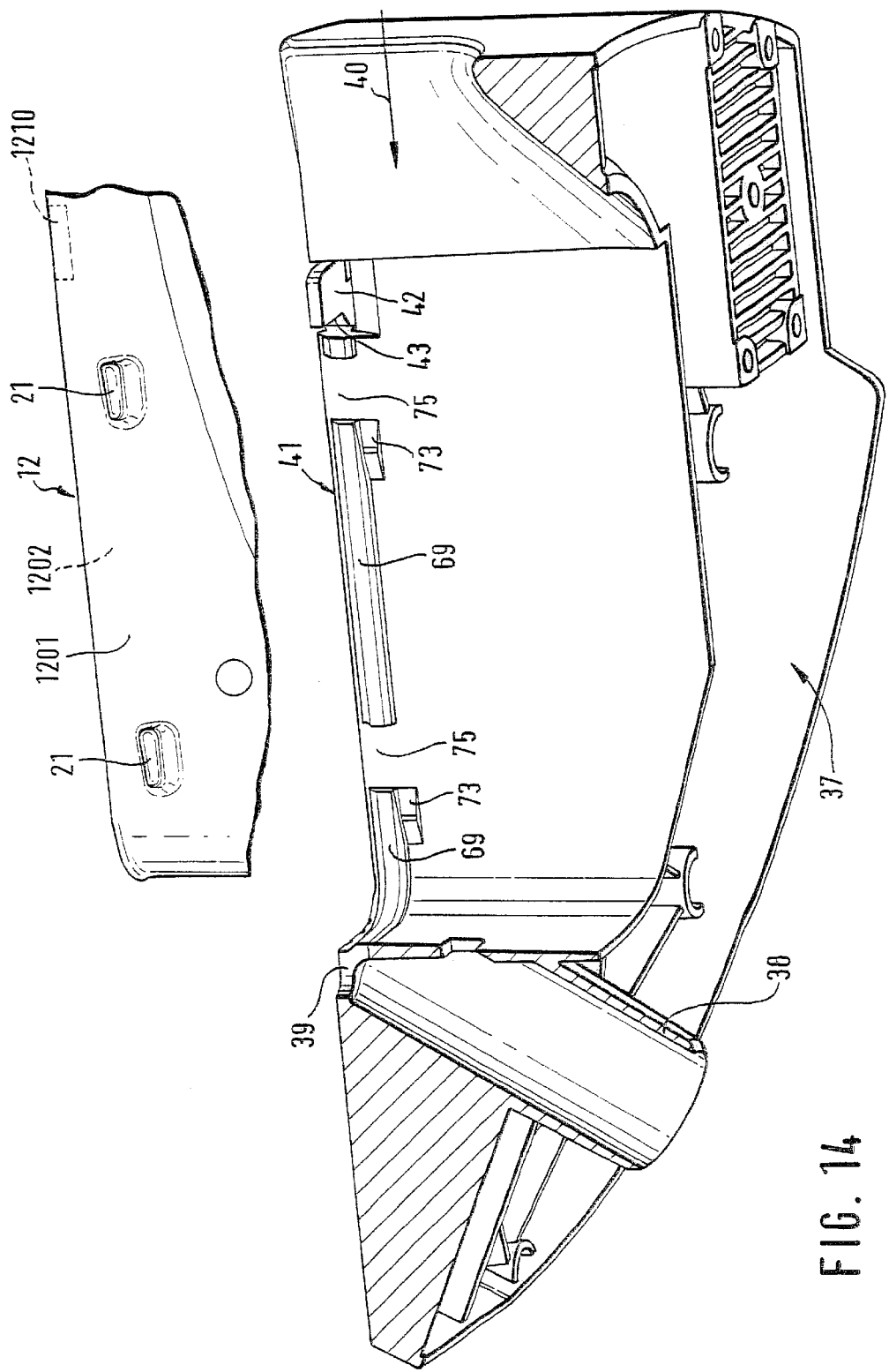
FIG. 14 is a three-dimensional, exploded view of the sawing table, with the corresponding housing region of the power jigsaw.

The function of the bayonet locking clipping system between the base housing 12 and the sawing table 37 is shown again in FIG. 14, in a partially sectional, oblique side view from beneath. It shows the guide springs 69, their gaps 75, the ramps 73 embodied as wedge-shaped toward the inside, and the locking button 42 with the detent stop 43. The suction fitting 38, the suction opening 39, and the recess 40 should also be emphasized as well as the side region of the base housing 12—seen in exploded form at the top—with the clamping clips 21 and the upper outer edge 68 of the base housing 12 for engaging in the recess 40 of the sawing table 37.

Figure 15:
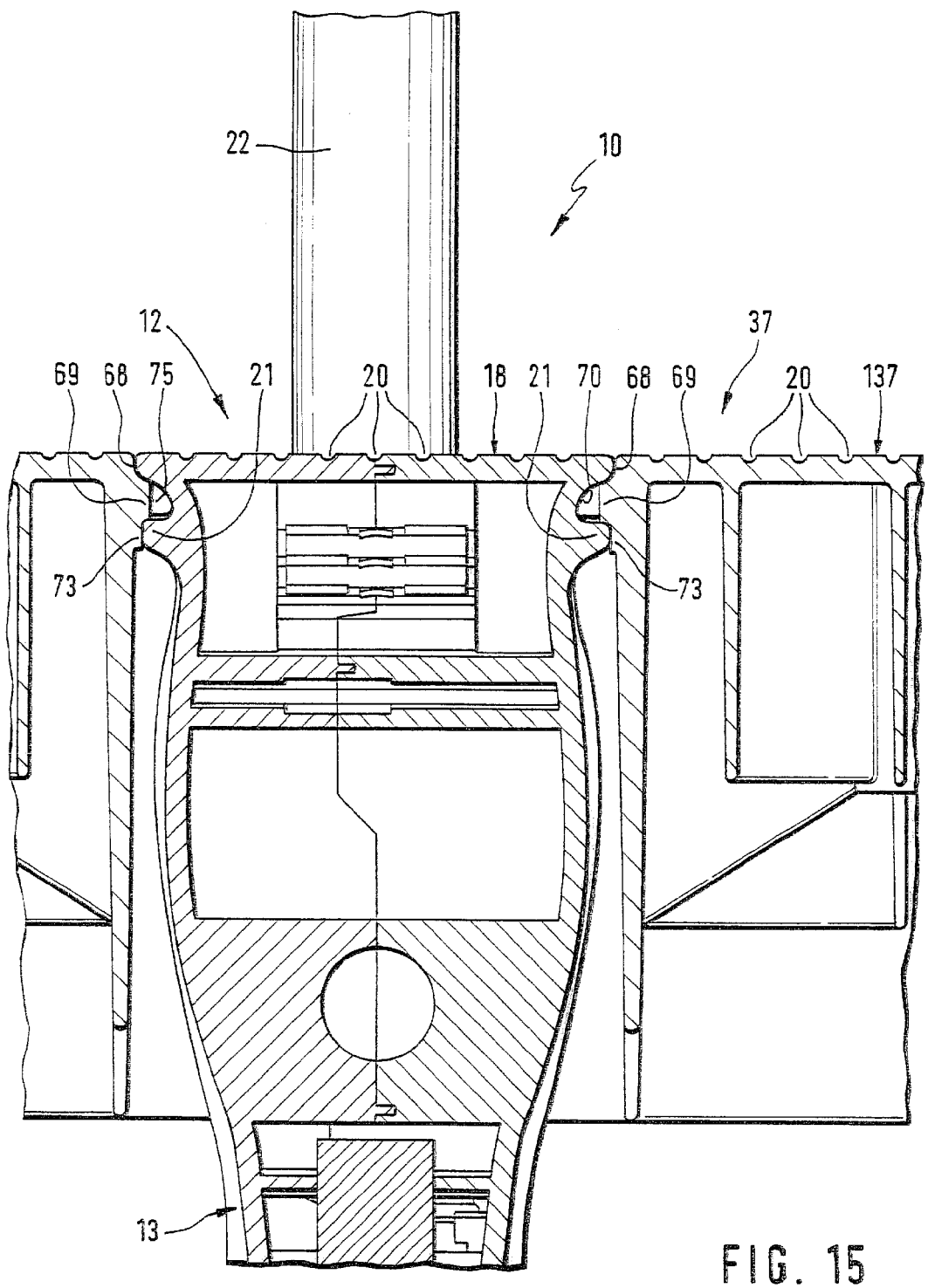
FIG. 15 shows a detail of the cross section of the base housing, with the coupled sawing table.

With a cross section of the base housing 12 and the sawing table 37, FIG. 15 shows the bayonet locking clamping system between the base housing 12 and the sawing table 37. It shows how the guide springs 69 are laterally and vertically supported between the longitudinally extending outer edge 68 and the clamping clips 21 and that a guide groove 70 for the insertion of the guide springs 69 is formed between the clamping clips 21 and the outer edge 68.

The ramps 73 are also shown, which are supported laterally against the clamping clips 21 and provide a horizontally play-free connection of the base housing 12 to the sawing table 37.

The grooves 20 in the support surface 18 of the housing 12 and in the support surface 137 of the sawing table 37 are also shown, as is the fact that the handle 13 protrudes far enough from underneath the sawing table 37 that it can be comfortably grasped by the user.

For stationary operation, the sawing table 37 is first fastened to a workbench. With the front side aligned toward the front, the power jigsaw 10 is then inserted from above into its recess 40 until the support surface 18 of the lower housing 12 of the power jigsaw 10 is flush with the planar support surface 137 of the sawing table 37. By then sliding the power jigsaw 10 into the recess 40, the power jigsaw 10 is clamped in bayonet locking fashion in relation to the sawing table 37 by virtue of the fact that the locking button 42 engages in detent fashion with its detent stop 43 in a recess 1210 of the base housing 12 and secures it—and therefore the power jigsaw 10—against unintentional detachment from the sawing table 37.

The two guide springs 69 along the upper edge of the recess 40 have a wedge-shaped cross section. They are spatially clamped between the upper outer edge 68 of the base housing 12 and the wedge-shaped, outwardly tapering clamping clips 21 on the outsides of the base housing 12. This spatial clamping is horizontally improved by virtue of the fact that the outside of the clamping clips 21 are laterally supported in a laterally wedged fashion against inclined surfaces of ramps 73.

In order to detach the power jigsaw 10 from the sawing table 37, first the locking button 42 must be pressed down in relation to the surface 41 so that the detent stop 43 can come down out of the recess 1210 and as a result, the locking connection is released. By subsequently sliding the machine horizontally out of the recess 40, the power jigsaw 10 can be pulled up out of the sawing table 37 when the clamping clips 21 have reached the gaps 75 of the guide springs 69.

Due to the inclination of the handle 13 in relation to the housing 12 by approx. 20°, the machine rests securely in the user's hand, wherein the machine weight is supported by the back of the hand and the forearm and the free mobility of the power jigsaw can be optimally controlled when turning and pivoting.

In hand-held operation of the power jigsaw, 10 coupled to the sawing table 37, the support surface 137 of the sawing table 37 can be pushed upward against the underside of the work piece. Since the saw blade 33 saws when pulled downward, the work piece 19 is thereby pulled against the support surfaces 18, 137 of the base housing 12 and the sawing table 37. This permits vibration-free, smooth sawing.

The projections 30 that protrude laterally beyond or laterally encompass the switch button 15 prevent the power jigsaw 10 from being unintentionally switched on, particularly when it is being inserted into the sawing table 37.

Figure 16:
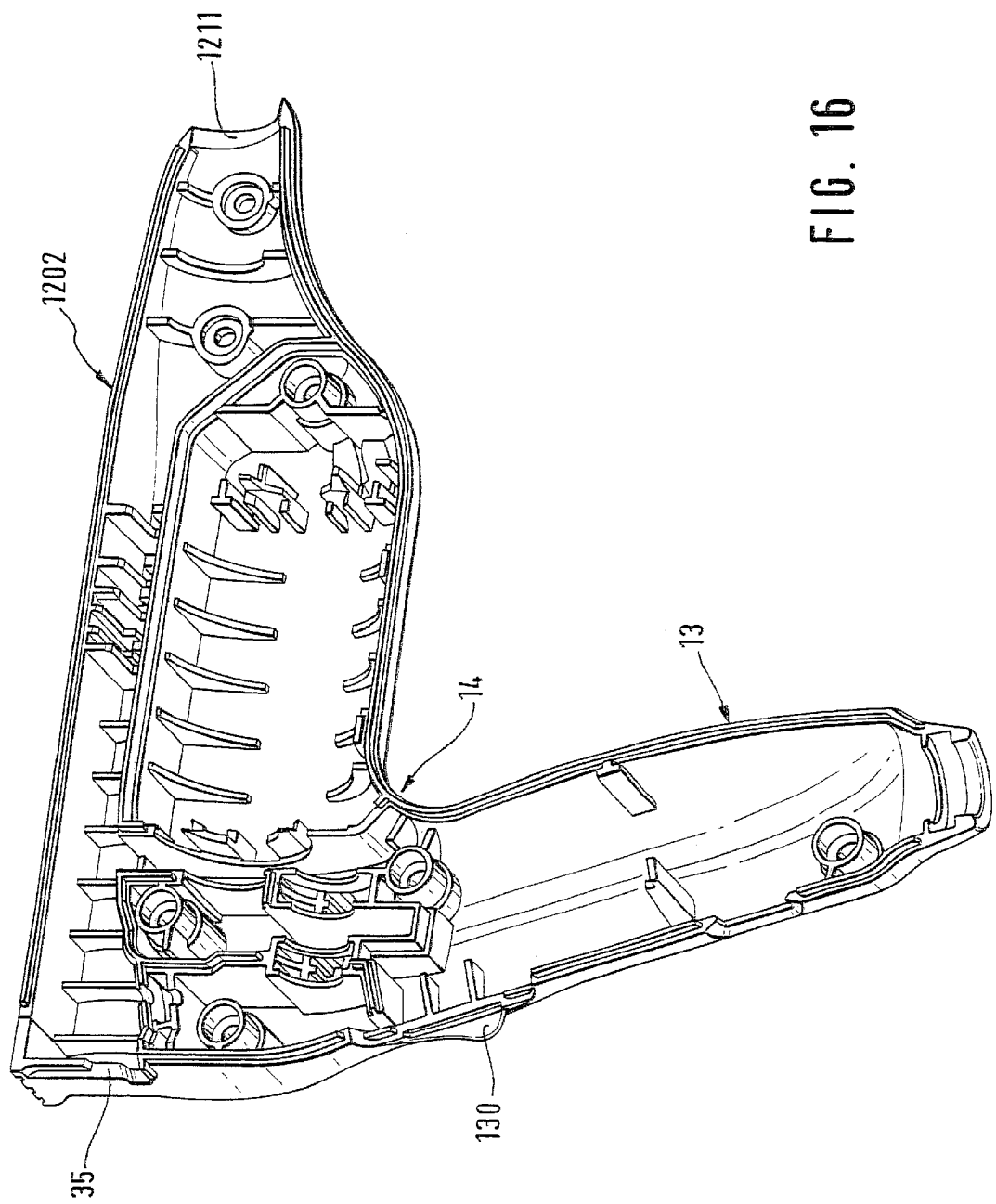
FIG. 16 shows the inside view of the right half-shell of the base housing.

The inside view of the right half-shell 1202 of the base housing 12 shown in FIG. 16 clearly shows the handle 13, the throat 14, one of the projections 130, the mounting slot 35, the mouth 1211 of the opening, and narrow, ring-like encompassing supports of the lower arm 221, as well as screw openings for the fixed coupling of the housing 12 to the frame 22.

Figure 17:
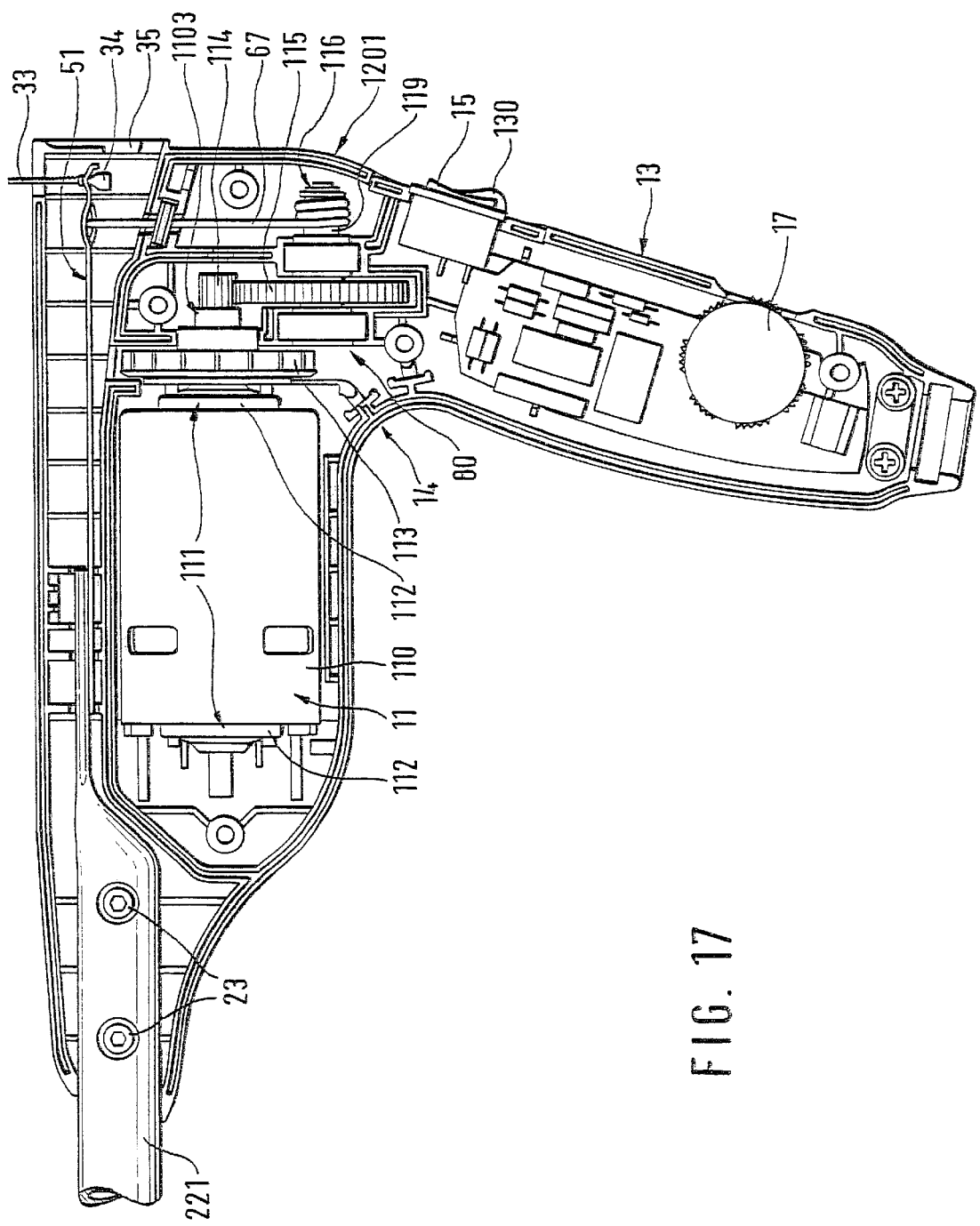
FIG. 17 shows the left half-shell with the mounted motor and transmission.

Complementary to FIG. 16, FIG. 17 shows the left half-shell 1201 of the base housing 12 with the mounted motor 11 and transmission, wherein rubber rings 112 constitute elastic support points 111 in the motor housing 110 in order to contain the motor 11 in an oscillation-damped manner. A motor shaft 1103 supports a fan 113 and an axially adjacent pinion 114 which meshes with an counterpart pinion 115. The counterpart pinion 115 is non-rotatably supported on a crankshaft 116 which on its free end, has a crank pin 119 for driving the connecting rod 67.

What is claimed is:

1. A hand-guided power jigsaw (10) having a jigsaw blade (33) which can be detachably clamped between the ends (53, 54) of two essentially parallel upper and lower arms (222, 221) that are comprised of a U-shaped frame (22), and which can be driven in a reciprocating manner by a motor (11) built into the jigsaw (10), wherein the lower arm (221) has a handle (13) with a switch button (15), characterized in that the lower arm (221) has a base housing (12) attached to it, which is embodied in the form of a pistol, is comprised of half shells (1201) that can be assembled longitudinally and has said handle (13) protruding from its underside at an angle toward the back of the base housing (12), wherein a rear outer contour at the top of the handle, at the transition to the outer contour of the base housing (12), has a curved, angled throat (14), which rests in a hand of a user in a horizontally and vertically supported fashion, wherein the base housing (12) at least partially encompasses the lower arm (221), wherein the base housing (12) is detachably connectable in detent fashion to a sawing table, wherein said sawing table is attachable to a workbench, and wherein the sawing table (37) is coupled in a play-free manner to the base housing (12) by means of common longitudinal, groove-spring guides (69,73).

2. A hand-guided power jigsaw (10) having a jigsaw blade (33) which can be detachably clamped between the ends (53, 54) of two essentially parallel upper and lower arms (222, 221) that are comprised of a U-shaped frame (22), and which can be driven in a reciprocating manner by a motor (11) built into the jigsaw (10), wherein the lower arm (221) has a handle (13) with a switch button (15), characterized in that the lower arm (221) has a base housing (12) attached to it, which is embodied in the form of a pistol, is comprised of half shells (1201) that can be assembled longitudinally and has said handle (13) protruding from its underside at an angle toward the back of said base housing (12), wherein a rear outer contour at the top of said handle, at the transition to the outer contour of the base housing (12), has a curved, angled throat (14), which rests in a hand of a user in a horizontally and vertically supported fashion, wherein the upper part of the pistol-shaped base housing (12) at least partially encompasses the lower arm (221) so that the lower arm (221) is partially embedded in the base housing (12) and partially protrudes out of it, wherein the switch button (15) is disposed on a front of the handle (13) between projections (130), and wherein the base housing (12) encompasses the motor (11) and drive means (80) for moving the jigsaw blade (33) back and forth.

3. The jigsaw according to claim 1, characterized in that the sawing table (37) is coupled in a play-free manner to the base housing (12) by means of common longitudinal, groove-spring guides (69, 73).

4. A hand-guided power jigsaw (10) having a jigsaw blade (33) which can be detachably clamped between the ends (53, 54) of two essentially parallel upper and lower arms (222, 221) that are comprised of a U-shaped frame (22), and which can be driven in a reciprocating manner by a motor (11) built into the jigsaw (10), wherein the lower arm (221 ) has a handle (13) with a switch button (15), characterized in that the lower arm (221) has a base housing (12) attached to it, which is embodied in the form of a pistol, is comprised of half shells (1201) that can be assembled longitudinally and has said handle (13) protruding from its underside at an angle toward the back of the base housing (12), wherein a rear outer contour at the top of the handle, at the transition to the outer contour of the base housing (12), has a curved, angled throat (14), which rests in a hand of a user in a horizontally and vertically supported fashion, wherein the base housing (12) at least partially encompasses the lower arm (221), wherein, adjacent to the throat (14), the base housing (12) extends further toward the back and forms a forearm support for the user.

5. A hand-guided power jigsaw (10) having a jigsaw blade (33) which can be detachably clamped between the ends (53, 54) of two essentially parallel upper and lower arms (222, 221) that are comprised of a U-shaped frame (22), and which can be driven in a reciprocating manner by a motor (11) built into the jigsaw (10), wherein the lower arm (221) has a handle (13) with a switch button (15), characterized in that the lower and (221) has a base housing (12) attached to it, which is embodied in the form of a pistol, is comprised of half shells (1201) that can be assembled longitudinally and has said handle (13) protruding from its underside at an angle toward the back of the base housing (12), wherein a rear outer contour at the top of the handle, at the transition to the outer contour of the base housing (12), has a curved, angled throat (14), which rests in a hand of a user in a horizontally and vertically supported fashion, wherein the base housing (12) at least partially encompasses the lower arm (221), wherein the switch button (15) is disposed on the front of the handle (13) between projections (130) on the handle.

6. A hand-guided power jigsaw (10) having a jigsaw blade (33) which can be detachably clamped between the ends (53, 54) of two essentially parallel upper and lower arms (222, 221) that are comprised of a U-shaped frame (22), and which can be driven in a reciprocating manner by a motor (11) built into the jigsaw (10), wherein the lower arm (221) has a handle (13) with a switch button (15), characterized in that the lower arm (221) has a base housing (12) attached to it, which is embodied In the form of a pistol, is comprised of half shells (1201) that can be assembled longitudinally and has said handle (13) protruding from its underside at an angle toward the back of the base housing (12), wherein a rear outer contour at the top of the handle, at the transition to the outer contour of the base housing (12), has a curved, angled throat (14), which rests in a hand of a user in a horizontally and vertically supported fashion, wherein the base housing (12) at least partially encompasses the lower arm (221), wherein on a free end, the upper arm (222) has an end housing (24) which encompasses clamping means (25) for detachably clamping the jigsaw blade (33) and drive means for moving the jigsaw blade (33) back and forth.

7. A hand-guided power jigsaw (10) having a jigsaw blade (33) which can be detachably clamped between the ends (53, 54) of two essentially parallel upper and lower arms (222, 221) that are comprised of a U-shaped frame (22), and which can be driven in a reciprocating manner by a motor (11) built into the jigsaw (10), wherein the lower arm (221) has a handle (13) with a switch button (15), characterized in that the lower arm (221) has a base housing (12) attached to it, which is embodied in the form of a pistol, is comprised of half shells (1201) that can be assembled longitudinally and has said handle (13) protruding from its underside at an angle toward the back of the base housing, wherein a rear outer contour at the top of the handle, at the transition to the outer contour of the base housing (12), has a curved, angled throat (14), which rests in a hand of a user in a horizontally and vertically supported fashion, wherein the base housing (12) at least partially encompasses the lower arm (221), the base housing having a flat support surface at the top thereof for supporting a work piece (19), wherein the support surface (18) is structured with parallel grooves (20), is disposed above the lower arm (221).

8. A hand-guided power jigsaw (10) having a jigsaw blade (33) which can be detachably clamped between the ends (53, 54) of two essentially parallel upper and lower arms (222, 221) that are comprised of a U-shaped frame (22), and which can be driven in a reciprocating manner by a motor (11) built into the jigsaw (10), wherein the lower arm (221) has a handle (13) with a switch button (15), characterized in that the lower arm (221) has a base housing (12) attached to it, which is embodied in the form of a pistol, is comprised of half shells (1201) that can be assembled longitudinally and has said handle (13) protruding from its underside at an angle toward the back of the base housing (12), wherein a rear outer contour at the top of the handle, at the transition to the outer contour of the base housing (12), has a curved, angled throat (14), which rests in a hand of a user in a horizontally and vertically supported fashion, wherein the base housing (12) at least partially encompasses the lower arm (221), wherein the jigsaw has a work piece depressor (27) which can be slid parallel to the jigsaw blade (33) and simultaneously serves as a finger deflector (28).

9. A hand-guided power jigsaw (10) having a jigsaw blade (33) which can be detachably clamped between the ends (53, 54) of two essentially parallel upper and lower arms (222, 221) that are comprised of a U-shaped frame (22), and which can be driven in a reciprocating manner by a motor (11) built into the jigsaw (10), wherein the lower arm (221) has a handle (13) with a switch button (15), characterized in that the lower arm (221) has a base housing (12) attached to it, which is embodied in the form of a pistol, is comprised of half shells (1201) that can be assembled longitudinally and has said handle (13) protruding from its underside at an angle toward the back of the base housing (12), wherein a rear outer contour at the top of the handle, at the transition to the outer contour of the base housing (12), has a curved, angled throat (14), which rests In a hand of a user in a horizontally and vertically supported fashion, wherein the base housing (12) at least partially encompasses the lower arm (221), wherein the arms (221, 222) have flat, free ends (53, 54) and each support a leaf spring (50, 51) by means of rivets, and wherein a sawing table (37) is coupled in a play-free manner to the base housing (12) by means of common longitudinal, groove-spring guides (69.73).

10. The jigsaw according to claim 9, characterized in that on their free ends (56, 57), the leaf springs (50, 51) each have a fork slot (58) from which an end of the jigsaw blade (33) can be detachably suspended.

11. The jigsaw according to claim 10, characterized in that at their free ends (56, 57), the leaf springs (50, 51) each have a channel (62) extending lateral to the fork slot (58) and a nipple (34) of the jigsaw blade (33) can be supported with its sharp edge (61), in a centered and pivotably articulating fashion in this channel (62).

12. The jigsaw according to claim 11, characterized in that the nipple (34) is comprised of plastic and have a square region (36) which points toward the jigsaw blade (33) and engages in the fork slot (58) in a play-free manner.

13. The jigsaw according to claim 6, characterized in that the frame (22) is comprised of metal and the base housing (12) and the end housing (24), which are embodied with half-shell construction, are comprised of plastic.

14. The jigsaw according to claim 9, characterized in that an upper one of the leaf springs (50) is U-shaped having upper and lower legs (502, 501) and with its lower leg (501) fastened to the free end (53) of one of the arms (222) so that the legs (501, 502) point outward in the same direction as one of said arms (222, wherein a curved part (52) and the upper leg (502) can pivot freely.

15. The jigsaw according to claim 9, characterized in that a lower one of the leaf springs (51) can be coupled to the motor in a positively engaging manner by means of a drive mechanism in the form of a connecting rod (67).

16. The jigsaw according to claim 9, characterized in that on its free end (57), a lower one of the leaf springs (51) has a loop (64) that curves toward the bottom thereof and is produced by stamping, which constitutes an eyelet (65) for the engagement of a connecting rod (67).

17. A hand-guided power jigsaw (10) having a jigsaw blade (33) which can be detachably clamped between the ends (53, 54) of two upper and lower arms (222, 221) that are comprised of a U-shaped frame (22), and which can be driven in a reciprocating manner by a motor (11) built into the jigsaw (10), wherein the lower arm (221) has a handle (13) with a switch button (15), characterized in that the lower arm (221) has a base housing (12) attached to it, which is embodied in the form of a pistol, is comprised of half shells (1201) that can be assembled longitudinally and has said handle (13) protruding from its underside at an angle toward the back of said base housing (12), wherein a rear outer contour at the top of said handle, at the transition to the outer contour of the base housing (12), has a curved, angled throat (14), which rests in a hand of a user in a horizontally and vertically supported fashion, wherein the upper part of the pistol-shaped base housing (12) at least partially encompasses the lower arm (221) so that the lower arm (221) is, partially embedded in the base housing (12) and partially protrudes out of it, wherein the switch button (15) is disposed on a front of the handle (13) between projections (130), and wherein the base housing (12) encompasses the motor (11) and drive means (80) for moving the jigsaw blade (33) back and forth.

* * * * *